United States Patent [19]

Yanai et al.

[11] 4,444,399  
[45] Apr. 24, 1984

[54] MECHANICAL SEAL AND METHOD OF FORMING A SLIDING SURFACE THEREOF

[75] Inventors: Tadamasa Yanai, Takahashi; Risaburo Sagehashi, Souja; Yoshio Kameyama, Souja; Takao Shimomura, Souja, all of Japan

[73] Assignee: Eagle Industry Co., Ltd., Tokyo, Japan

[21] Appl. No.: 414,240

[22] Filed: Sep. 2, 1982

Related U.S. Application Data

[62] Division of Ser. No. 317,814, Nov. 3, 1981, Pat. No. 4,420,162.

[30] Foreign Application Priority Data

Nov. 4, 1980 [JP] Japan ................................. 55-153840  
Mar. 5, 1981 [JP] Japan ................................. 56-30450

[51] Int. Cl.³ ............................................. F16J 15/34  
[52] U.S. Cl. ..................................... 277/1; 277/96.1; 156/659.1  
[58] Field of Search ..................... 156/658, 659.1, 660; 277/96.1

[56] References Cited

U.S. PATENT DOCUMENTS

| 3,658,610 | 4/1972 | Arita et al. | 156/659.1 |
| 3,929,341 | 12/1975 | Clark | 277/1 |
| 4,213,819 | 7/1980 | Werthmann | 156/660 |

FOREIGN PATENT DOCUMENTS 644840 7/1962 Canada ............................. 277/96.1

*Primary Examiner*—Robert I. Smith  
*Attorney, Agent, or Firm*—Jordan and Hamburg

[57] ABSTRACT

A mechanical seal has a predetermined number of fine grooves formed on a sliding surface thereof, both ends of the fine grooves respectively reaching the outer peripheral end and the inner peripheral end of the sliding surface, part of the fine grooves being inclined forwardly and the remainder inclined rearwardly with respect to the relative rotational direction of the sliding surface. With those fine grooves it is intended to improve the sealing effect and the lubricating effect of the sliding surface. Also provided is a method of forming such a sliding surface.

6 Claims, 9 Drawing Figures

MECHANICAL SEAL AND METHOD OF FORMING A SLIDING SURFACE THEREOF

BACKGROUND OF INVENTION

This is a division of application Ser. No. 317,814, filed Nov. 3, 1981 now U.S. Pat. No. 4,420,162.

This invention relates to a mechanical seal.

Heretofore, as means for decreasing the amount of leakage in a mechanical seal, there have widely been known a method wherein, with respect to the sliding surface of a seat ring and that of a seal ring both rings constituting a mechanical seal, a fluid film interposed between those sliding surfaces is made thinner by improving the surface accuracy of the sliding surfaces, and a methods wherein a spiral groove is formed on the sliding surface and the fluid film is made thinner by utilization of the resulting pumping effect.

However, in both of the above conventional method, the decrease of the amount of leakage results in increase in the generation of heat induced by sliding motion, thus causing heat deteriorations such as heat deformation and wear on a sliding surface and in some cases further causing breakage of the seal such as cracking and foaming on the sliding surface, and eventually the sealing durability deteriorates.

Thus, it has heretofore been considered very difficult to control both sealing performance and sliding heat generation which are contrary to each other, and to this end there have been adopted heat-resistant sliding materials for the foregoing seat ring and seal ring to increase the safety factor, or a little increase in the amount of leakage has been allowed.

As means for forming a sliding surface of a seat ring or seal ring in conventional mechanical seals, there have widely been adopted lapping, grinding, cutting and molding methods, and after application of these methods there is applied polishing, buffing, or a mechanical or chemical surface roughing.

However, although such conventional methods are somewhat effective in achieving their object, namely, the maintenance of sealing durability, they cannot specify the distribution ratio between a sealing surface portion and a lubricating surface portion of a sliding surface, and therefore it has not yet been possible to properly control the amount leakage and the of heat generated on the sliding surface.

BRIEF SUMMARY OF INVENTION

This invention has been accomplished in view of the aforesaid problems. It is an object of this invention to provide a mechanical seal greatly superior not only in sealing performance but also in lubricating performance and further superior in sealing durability wherein the leakage of fluid is prevented by a sliding contact between a seat ring fixed to a housing and a seal ring fixed to a rotating shaft which is inserted through the seat ring, the seal ring being adapted to rotate together with the rotating shaft.

It is another object of this invention to provide a method of easily manufacturing a mechanical seal capable of controlling both the sealing performance or the amount of leakage and the lubricating performance or the amount of heat generated.

The aforesaid objects of this invention can be attained by a mechanical seal of a construction such that fine grooves are formed on the sliding surface of either a seat ring or a seal ring so that both ends thereof respectively reach the outer peripheral end and the inner peripheral end of the sliding surface and so that part of the fine grooves are inclined forwardly and the remainder inclined rearwardly with respect to the relative rotational direction, and among the fine grooves, those in the relative rotational direction for performing a pumping action or sealing action are formed predominantly, and by a method wherein the fine grooves of such a construction are formed by photo-printing the fine grooves on the sliding surface onto which has been applied a photosensitive material in advance, or by stamping or printing with inks the fine grooves on the sliding surface, followed by etching.

A brief summary of this invention has been given above, but the above and further objects and novel features of the invention will more fully appear from the following detailed description when the same is read in connection with the embodiments shown in the accompanying drawings. It is to be understood, however, that the drawings are for purpose of illustration only and are not intended to limit the scope of the invention.

DESCRIPTION OF PREFERRED EMBODIMENTS

Figure 1:
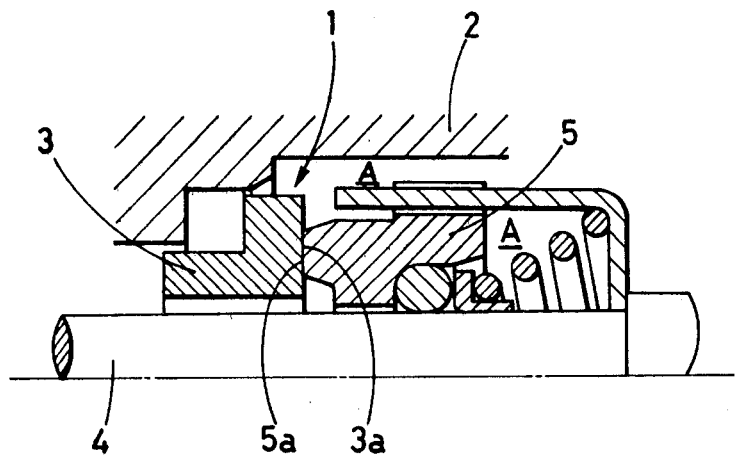
FIG. 1 is a partially cutaway sectional view of a mechanical seal in a mounted state according to one embodiment of this invention.
Figure 2:
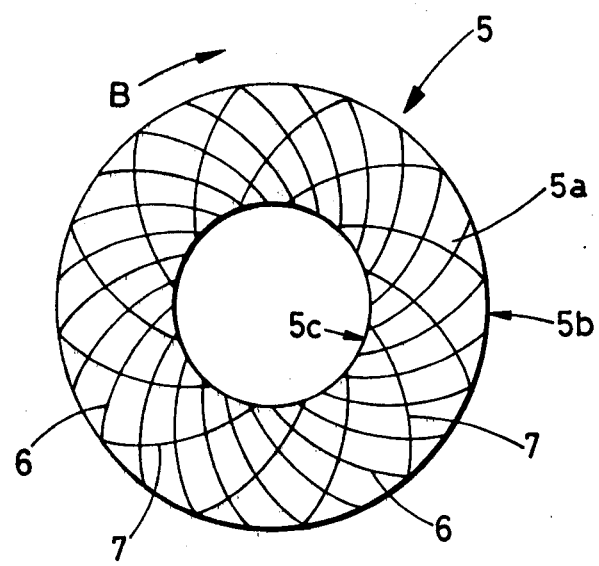
FIG. 2 is a front view of a sliding surface of a seal ring.
Figure 3:
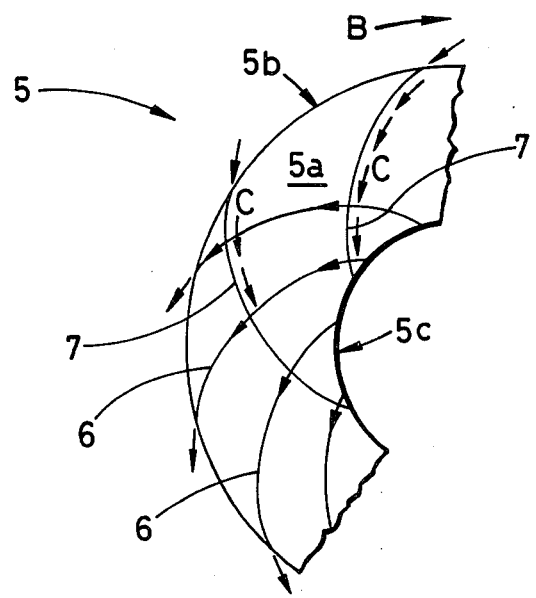
FIG. 3 is an enlarged front view of the principal part of the sliding surface of the seal ring showing the state of movement of a sealing fluid.

As shown in FIGS. 1 and 2, numeral 1 designates an external pressure type mechanical seal with its principal parts illustrated on a larger scale. The seal is intended to prevent leakage of fluid (A) present about the outer periphery of the mechanical seal 1 by sliding contact between a seat ring 3 fixed to a housing 2 and a seal ring 5 fixed to a rotating shaft 4 which is inserted through the seat ring 3, the seal ring 5 being adapted to rotate together with the rotating shaft 4. On a sliding surface 5a of the seal ring 5 there are formed fine grooves 6 which are inclined rearwardly in the diametrical direction of the sliding surface 5a with respect to the rotational direction (arrow B) of the seal ring 5, and also fine grooves 7 which are inclined forwardly oth ends of the fines grooves 6 and 7 respectively reaching the outer peripheral end 5b and the inner peripheral end 5c of the sliding surface 5a so tha the fine grooves 6 and 7 cross each other. The forwardly inclined fine grooves 7 function to form a lubricating fluid film on the sliding surface 5a (lubricating function), while the rearwards inclined fine grooves 6 function to seal fluid by utilization of a pumping action (sealing function). As shown on a larger scale in FIG. 3, the sealing fluid (A) is introduced into the fine grooves 7 by virtue of the rotation of the sliding surface 5a and of its viscous action, then moves while staying in the fine grooves 7 and forms a lubricating fluid film thereby providing lubricating between the sliding surface 5a of the seal ring 5 and the sliding surface 3a of the seat ring 3. The sealing fluid (A) which has moved along the forwardly inclined fine grooves 7 is then transferred into the rearwardly inclined fine grooves 6 at the points where the fine grooves 6 and 7 cross each other, so that the fluid (A) is discharged to the intake (the outer peripheral end 5b side) without reaching the inner peripheral end 5c of the sliding surface 5a. In this embodiment, therefore, the forwardly inclined fine grooves 7 and the rearwardly inclined fine grooves 6 may be formed so as to afford a discharge capacity surpassing the amount of fluid introduced between the sliding surfaces 3a and 5a, that is, in such a manner that the discharge capacity of the rearwardly inclined fine grooves 6 surpasses the intake capacity of the forwardly inclined fine grooves 7. In other words, the number, shape or direction of the rearwardly inclined fine grooves 6 becomes predominant. In this case, for completely preventing the leakage of fluid through the mechanical seal 1 while the machine is not in operation, it is necessary to prevent the outflow from the fine grooves 6 and 7, and this purpose can be attained by finishing the fine grooves 6 and 7 within $0.2\mu$ to $0.7\mu$. In case a certain degree of leakage is allowed, when the time of shut down is short, or in case fluid does not come to the mechanical seal portion or pressure is released during shut down of the machine, the fine grooves 6 and 7 may be finished up to $1.0\mu$ to $3\mu$, within which range there can be obtained an ordinary sealing effect. Thus, the fine grooves 6 and 7 are controlled within the range of from $0.2\mu$ to $3\mu$ according to their purposes.

In the mechanical seal 1 having the above construction, the fine grooves 6 and 7 required to control the flow rate are formed on the sliding surface 5a of the seal wing 5, and it is desirable that those fine grooves be formed in the following manner.

According to a first method, the fine grooves 6 and 7 which have been designed in advance according to their purpose of use are photo-printed on the sliding surface 5a of the seal ring 5 onto which surface has been applied a photosensitive material in advance, followed by etching to form the fine grooves 6 and 7 on the sliding surface 5a.

According to a second method, the fine grooves 6 and 7 which have been designed in advance according to their purpose of use are stamped or printed with ink on the sliding surface 5a of the seal ring 5, followed by etching to form the fine grooves 6 and 7 on the sliding surface 5a.

Figure 4:
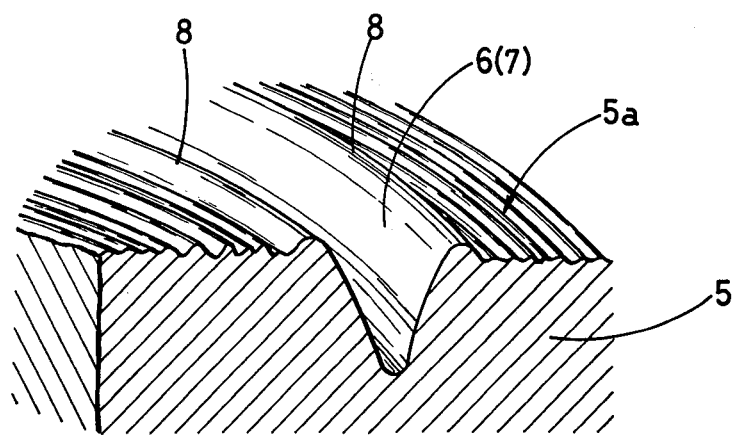
FIG. 4 is an enlarged transverse sectional view of the sliding surface of the seal ring.

According to a third method, the fine grooves 6 and 7 are formed by applying marking-off to the sliding surface 5a which has been subjected to a grinding or lapping process. It is preferable that the fine grooves 6 and 7 this formed by this marking-off process be then subjected to polishing. As a result, the cross-sectional shape of the fine grooves 6 and 7 becomes as shown in FIG. 4, that is, swollen portions 8 are formed at both edges of the fine grooves 6 and 7 whereby a lubricating fluid film is easily formed on the sliding surface 5a, and this effect is peculiar to the method of this invention.

Figure 5:
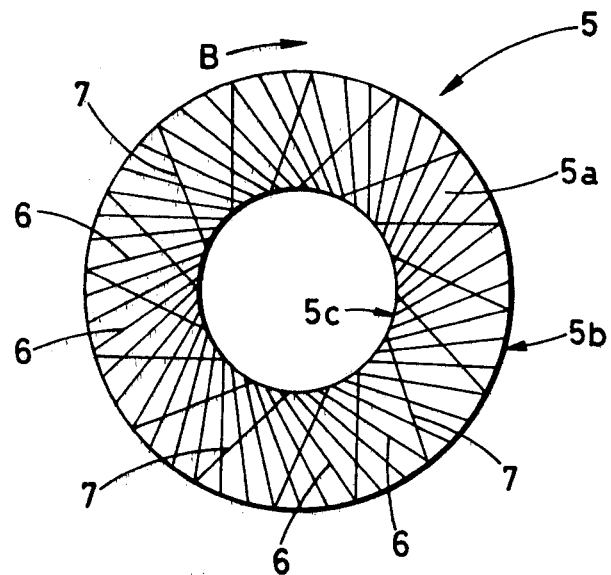
FIGS. 5 through 7 are each a front view of a sliding surface according to other embodiments of this invention.
Figure 6:
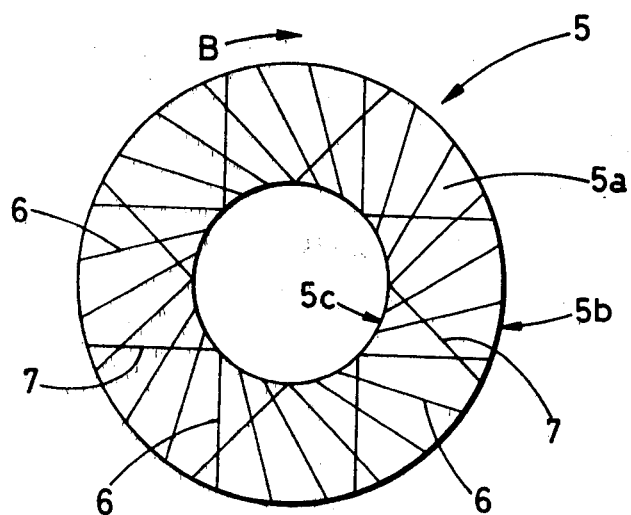
Figure 7:
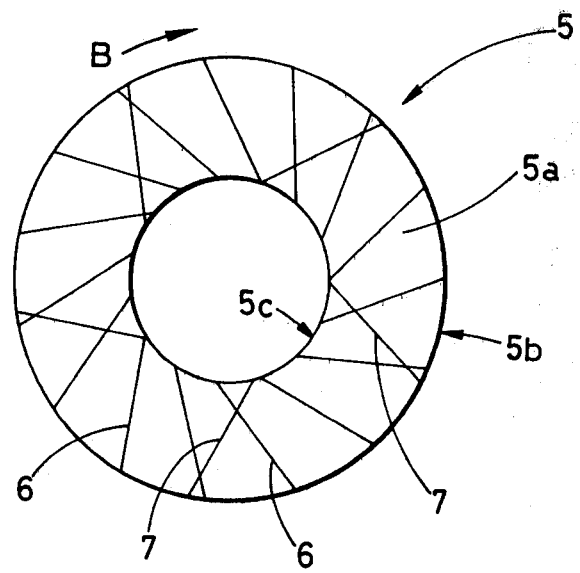

Thus, according to the aforesaid methods for forming the sliding surface, any shape and any number of the fine grooves 6 and 7 can be formed with a very high accuracy within the range capable of being shown in a design drawing, and as shown in FIGS. 5 through 7 the balance between the amount of leakage and the durability required of the mechanical seal 1 can be maintained so as to give the best sealing durability at all times by suitably selecting the relative construction of the rearwardly inclined fine grooves 6 and the forwardly inclined fine grooves 7.

Figure 8:
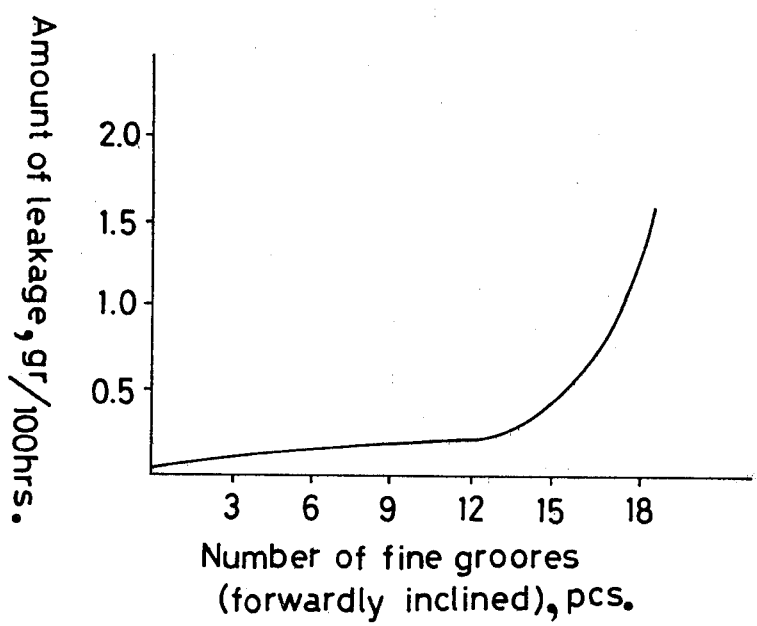
FIG. 8 is an experimental graph showing the relationship between the number of fine grooves formed on a sliding surface and the amount of leakage.

FIG. 8 is an experimental graph showing the relationship between the number of the fine grooves 6 and 7 and the amount of leakage, from which it is clearly seen that both are correlated with each other. In this experiment, the number of the rearwardly inclined fine grooves 6 was fixed at 16, while the number of the forwardly inclined fine grooves 7 was changed gradually. The shaft revolution and fluid pressure were 5,000 rpm and 6 kg/cm.G, respectively.

Figure 9:
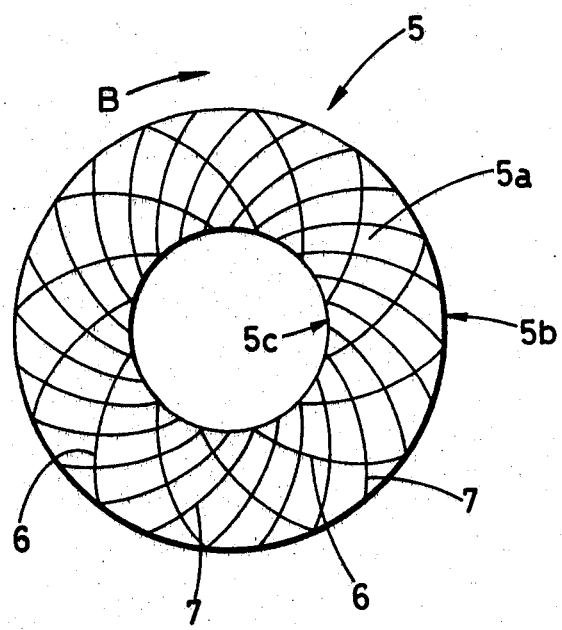
FIG. 9 is a front view of a sliding surface according to a further embodiment of this invention.

In the foregoing description, the mechanical seal 1 was of the external pressure type and the fine grooves 6 and 7 were formed on the sliding surface 5a of the seal ring 5 of the mechanical seal 1. In this invention, however, without being limited to such a construction, the mechanical seal 1 may be made of the internal pressure type and the fine grooves 6 and 7 may be formed on the sliding surface 3a of the seat ring 3 of the mechanical seal 1. In this case, however, the forwardly inclined fine grooves 7 come to exhibit a sealing effect and the rearwardly inclined fine grooves 6 exhibit a lubricating effect; therefore, as shown in FIG. 9, the number of the fine grooves 6 and that of the fine grooves 7 required with respect to the relative rotational direction (arrow B) are reversed. As illustrated, moreover, the planar shape of the fine grooves 6 and 7 may be rectilinear, curvilinear, or a mixed form of both straight and curved lines.

While preferred embodiments of this invention have been described, it is obvious that various other modifications and changes may be made without departing from the principle of the invention. Therefore, it is intended to cover in the appended claims all modifications and changes wherein the effects of the invention are substantially obtainable through the use of constructions substantially the same as or falling under the scope of the invention.

We claim:

1. A method of forming fine grooves on the surface of a seal ring of the type which is in rotary sliding contact with a seal member, comprising photo-printing a first plurality of forwardly inclined grooves on the surface of said seal ring extending to the outer peripheral edge and to the inner peripheral edge of said surface, photo-printing a second plurality of rearwardly inclined lines on the surface of said seal ring extending to the outer peripheral edge and the inner peripheral edge of said surface, said first and said second plurality of grooves being inclined forwardly and rearwardly with respect to the relative rotational direction of said seal ring, said second plurality of grooves being greater in number than said first plurality of grooves, arranging said first plurality of grooves relative to said second plurality of grooves such that said first plurality of grooves intersect said second plurality of grooves, and subjecting said surface to an etching treatment such that said grooves are etched into said surface, whereby during operation of said seal, said forwardly inclined grooves effect a lubricating action and said rearwardly inclined grooves effect a pumping action such that the provision of said greater number of rearwardly inclined grooves than forwardly inclined grooves produce a greater pumping action of said rearwardly inclined grooves than the intake capacity of said forwardly inclined grooves.

2. A method according to claim 1, comprising disposing the outer radial ends of said forwardly inclined grooves circumferentially forward of the respective inner radial ends considered in the direction of rotation of said seal ring.

3. A method according to claim 1, comprising disposing the outer radial ends of said rearwardly inclined grooves circumferentially rearwardly of the respective inner radial ends considered in the direction of rotation of said seal ring.

4. A method according to claim 1, comprising forming at least some of said grooves along straight lines.

5. A method according to claim 1, comprising forming at least some of said grooves along curvilinear lines.

6. A method according to claim 1, comprising forming at least some of said grooves along both straight lines and curvilinear lines.

* * * * *